(12) United States Patent
Shen

(10) Patent No.: US 10,408,475 B2
(45) Date of Patent: Sep. 10, 2019

(54) PURIFICATION STRUCTURE OF HEAT DISSIPATOR

(71) Applicant: LEADING STAND., Hsinchu (TW)

(72) Inventor: A-Ching Shen, Hsinchu (TW)

(73) Assignee: LEADING STAND, Hsinchu (TW)

( * ) Notice: Subject to any disclaimer, the term of this patent is extended or adjusted under 35 U.S.C. 154(b) by 173 days.

(21) Appl. No.: 15/681,841

(22) Filed: Aug. 21, 2017

(65) Prior Publication Data

US 2019/0056124 A1    Feb. 21, 2019

(51) Int. Cl.
| | |
|---|---|
| *B01F 3/04* | (2006.01) |
| *F24F 3/16* | (2006.01) |
| *F28D 5/00* | (2006.01) |
| *B01D 47/16* | (2006.01) |
| *F24F 5/00* | (2006.01) |
| *F24F 6/00* | (2006.01) |

(52) U.S. Cl.
CPC ............ *F24F 3/1603* (2013.01); *B01D 47/16* (2013.01); *B01F 3/04* (2013.01); *F24F 5/0035* (2013.01); *F28D 5/00* (2013.01); *F24F 2003/1617* (2013.01); *F24F 2006/006* (2013.01); *F24F 2221/225* (2013.01)

(58) Field of Classification Search
CPC .............. B01D 47/16; F28D 5/00; B01F 3/04
USPC .............................................. 62/310; 261/98
See application file for complete search history.

(56) References Cited

U.S. PATENT DOCUMENTS

| | | | |
|---|---|---|---|
| 4,338,266 A * | 7/1982 | Flower ...................... | B01J 19/32 261/106 |
| 6,367,277 B1 * | 4/2002 | Kinkel ................... | F24F 5/0035 261/98 |
| 7,143,597 B2 * | 12/2006 | Hyland ................. | F24F 5/0035 62/236 |

* cited by examiner

*Primary Examiner* — Robert A Hopkins
(74) *Attorney, Agent, or Firm* — Chun-Ming Shih

(57) ABSTRACT

A purification structure is located beside an inlet segment of a heat dissipator and contains: a casing, a water mesh, a water distribution seat, and a water collection device. The casing includes an air inlet and an air outlet. The water mesh includes multiple orifices and is accommodated between the air inlet and the air outlet of the casing. The water distribution seat is secured on a top of the water mesh and includes an aperture and multiple passages. The water collection device communicates with a bottom of the water mesh, and the water collection device includes a water accommodation chamber and a pump, wherein the pump has a water output segment connecting with a guide tube which communicates with the aperture of the water distribution seat, such that the water is outputted by the pump to flow toward the aperture via the guide tube.

6 Claims, 6 Drawing Sheets

PURIFICATION STRUCTURE OF HEAT DISSIPATOR

FIELD OF THE INVENTION

The present invention relates to a purification structure which prolongs a service life of the heat dissipator.

BACKGROUND OF THE INVENTION

A conventional heat dissipator is an air conditioner fixed outdoors and including an air inlet and an air outlet so that air purifies and exhausts out of the air outlet from the air outlet. However, a temperature of the conventional heat dissipator cannot be reduced at present invention, thus increasing exterior temperature.

The present invention has arisen to mitigate and/or obviate the afore-described disadvantages.

SUMMARY OF THE INVENTION

The primary objective of the present invention is to provide a purification structure which prolongs a service life of the heat dissipator.

Further objective of the present invention is to provide a purification structure which filters and purifies air flowing through the heat dissipator, and the purification structure cools temperature of the heat dissipator.

Another objective of the present invention is to provide a purification structure which recycles the water in the heat dissipator by using the water collection device.

DETAILED DESCRIPTION OF THE PREFERRED EMBODIMENTS

Figure 1:
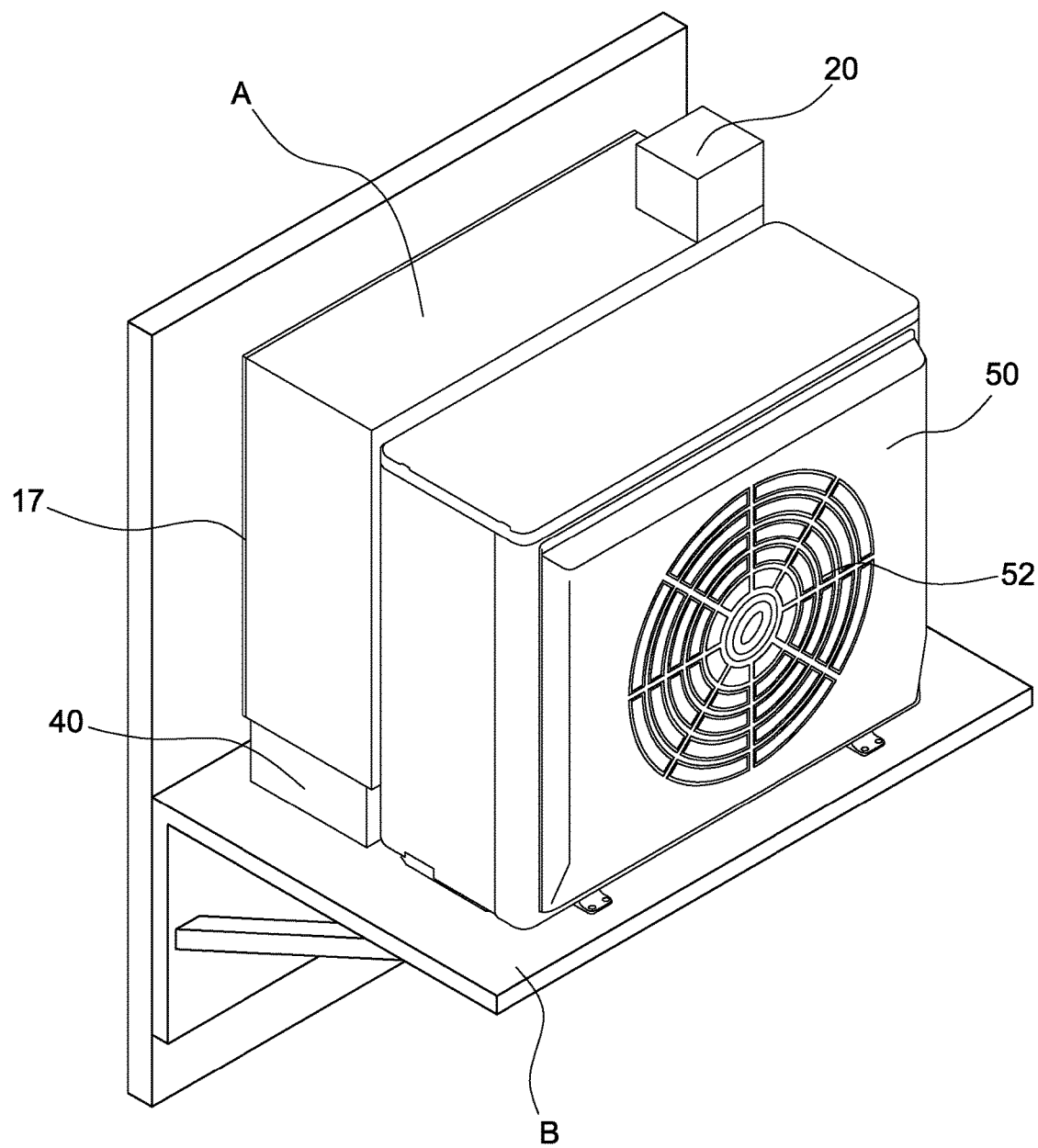
FIG. 1 is a perspective view showing the assembly of a purification structure of a heat dissipator according to a first embodiment of the present invention.
Figure 2:
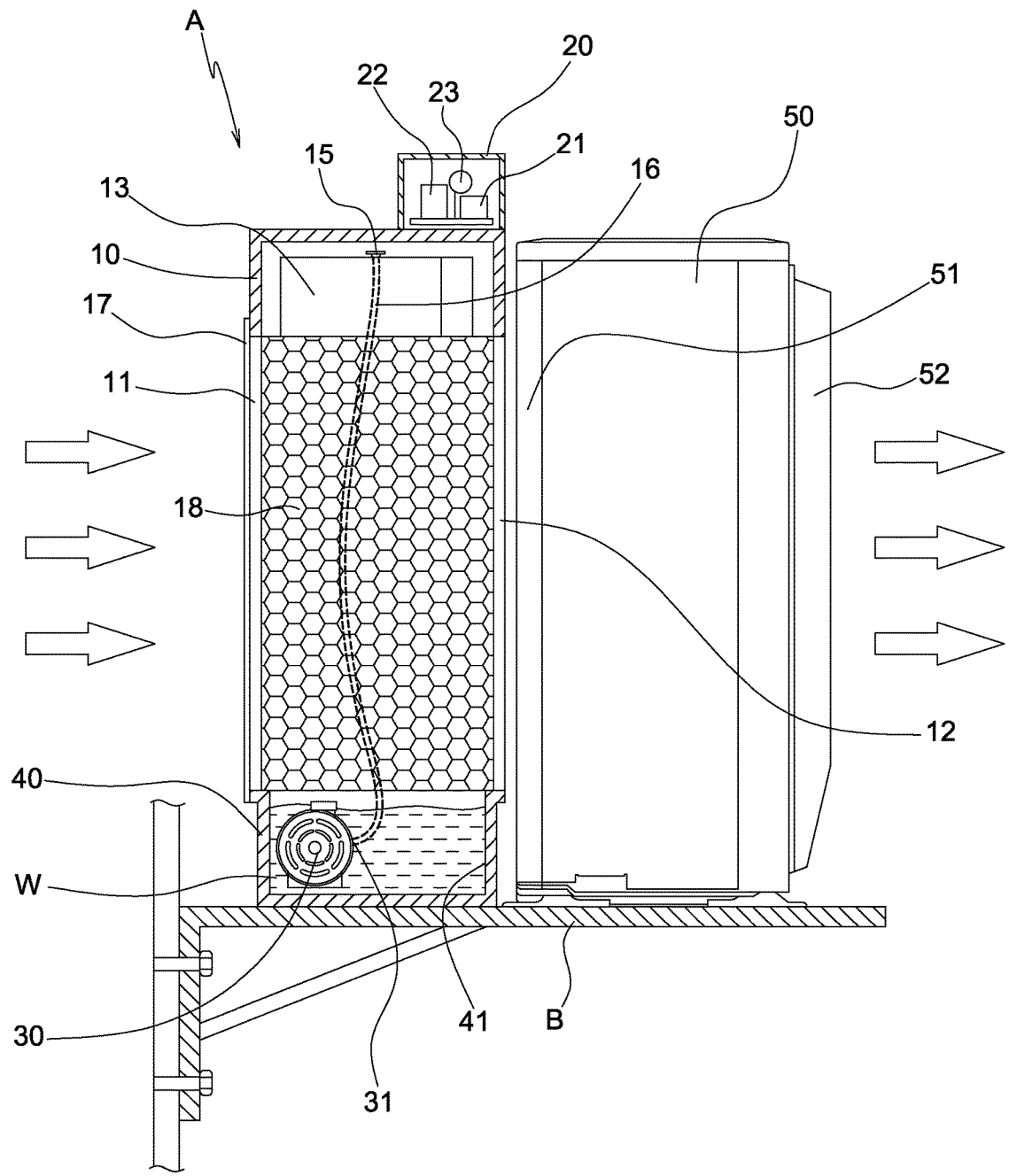
FIG. 2 is a cross sectional view showing the assembly of the purification structure of the heat dissipator according to the first embodiment of the present invention.
Figure 3:
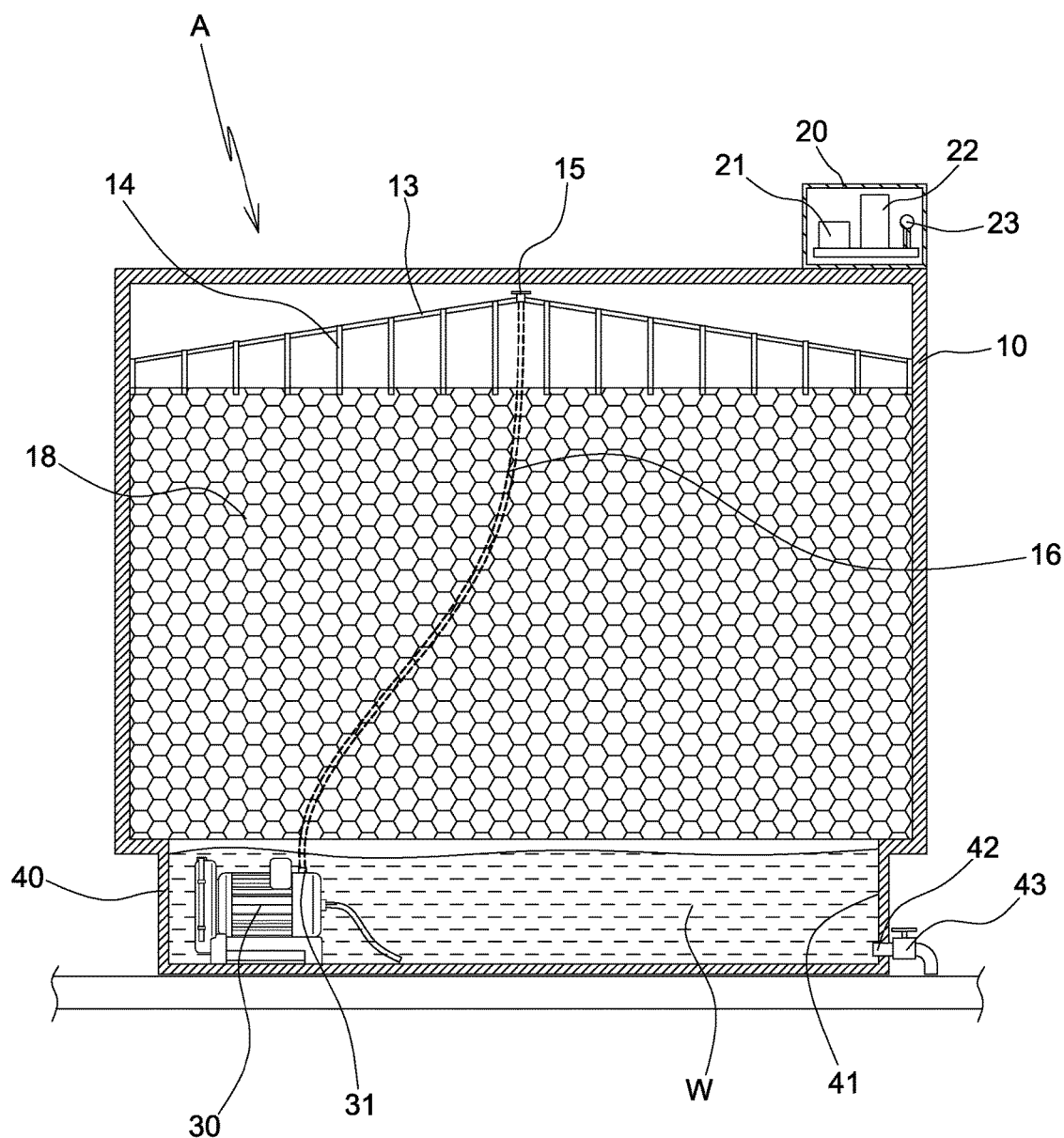
FIG. 3 is another cross sectional view showing the assembly of the purification structure of the heat dissipator according to the first embodiment of the present invention.
Figure 4:
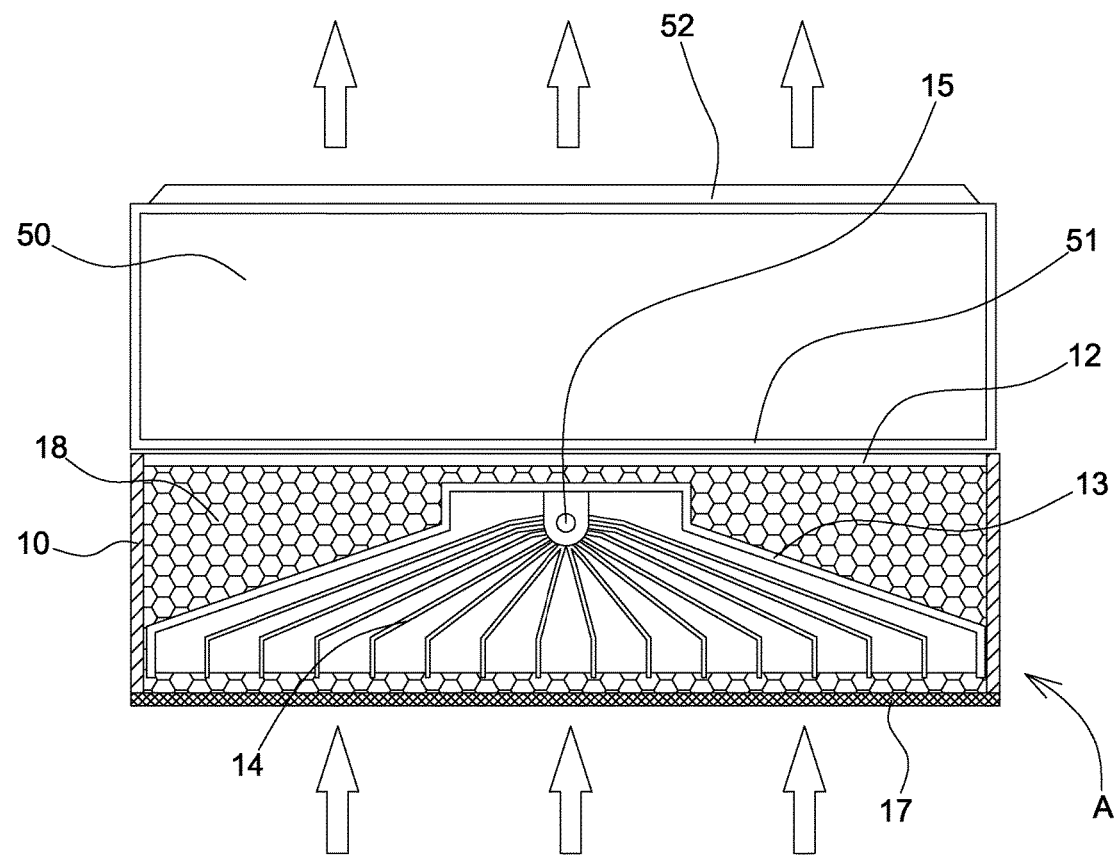
FIG. 4 is also another cross sectional view showing the assembly of the purification structure of the heat dissipator according to the first embodiment of the present invention.

With reference to FIGS. 1-4, a purification structure A according to a first embodiment of the present invention is located beside an inlet segment 51 of a heat dissipator 50, wherein the heat dissipator 50 is an air conditioner fixed on a support bracket B on an outer wall of a building and includes an outlet segment 52 opposite to the inlet segment 51, and the purification structure A comprises:

a casing 10 including an air inlet 11 and an air outlet 12 which are arranged on two ends of the casing 10 respectively and communicates with each other, wherein the air outlet 12 corresponds to the inlet segment 51 of the heat dissipator 50;

an air filter 17 arranged on the air inlet 11 of the casing 10 and configured to filter air flowing through the air filter 17, wherein the air filter 17 is removably washed after the air flows through the air filter unsmoothly, and a size of the air filter 17 mates with those of the heat dissipator 50 and the casing 10;

a water mesh 18 including multiple orifices defined on the water mesh 18, wherein the water mesh 18 is accommodated between the air inlet 11 and the air outlet 12 of the casing 10 so that the air flows into and out of the water mesh 18, wherein the water mesh 18 is made of flexible material so as to be bent flexibly at any desired angles, the flexible material is a plastic sheet or a metal sheet, and a size of the water mesh 18 matches with that of the heat dissipator 50; and a water distribution seat 13 secured on a top of the water mesh 18 and including an aperture 15 formed on a central position of a top of the water distribution seat 13, multiple passages 14 communicating with the aperture 15 so that water flows into the water mesh 18 via the multiple passages 14 from the aperture 15, thus purifying and cooling the air by using the water.

Thereby, when the air flows through the water mesh 18, heat of the heat dissipator 50 is dissipated so as to lower electricity consumption.

The purification structure A further comprises a water collection device 40 communicating with a bottom of the water mesh 18, and the water collection device 40 includes a water accommodation chamber 41 defined therein and configured to store the water flowing from the aperture 15, a pump 30 housed in the water collection device 40 and configured to output the water W, wherein the pump 30 has a water output segment 31 connecting with a guide tube 16 which communicates with the aperture 15 of the water distribution seat 13, such that the water W is outputted by the pump 30 to flow toward the aperture 15 via the guide tube 16, thus recycling the water W in the water collection device 40. The water collection device 40 further includes a water outlet 42 defined therein, a discharge valve 43 fixed outside the water collection device 40 and corresponding to the water outlet 42, such that the water W drains out the discharge valve 43 via the water outlet 42, after turning on the discharge valve 43. The water collection device 40 is made of plastic material or metal material.

The pump 30 is electrically coupled with an automatic on/off device 20, and the automatic on/off device 20 includes a temperature sensor 21 and a control switch 22, wherein the temperature sensor 21 is configured to sense an environment temperature so as to send a feedback signal (i.e. a sensed value of the environment sensor) to a circuit control panel of the pump 30, wherein when the environment temperature reaches set values, the circuit control panel sends an instruction to the control switch 22 so as to turn on/off the pump 30. For example, when the environment temperature lowers to a first set value, the circuit control panel sends the instruction to the control switch 22 so that the pump 30 turns off automatically; when the environment temperature raises to a second set value, the circuit control panel sends the instruction to the control switch 22 so that the pump 30 turns on automatically.

Thereby, the pump 30 turns on/off automatically, wherein when the water collection device 40 is frozen or lacks of the water, the pump 30 is powered off automatically.

The automatic on/off device 20 further includes an overload protection circuit 23 configured to protect the automatic on/off device 20 as electricity overloads, and the automatic on/off device 20 is electrically connected with a power supply of the heat dissipator 50.

Figure 5:
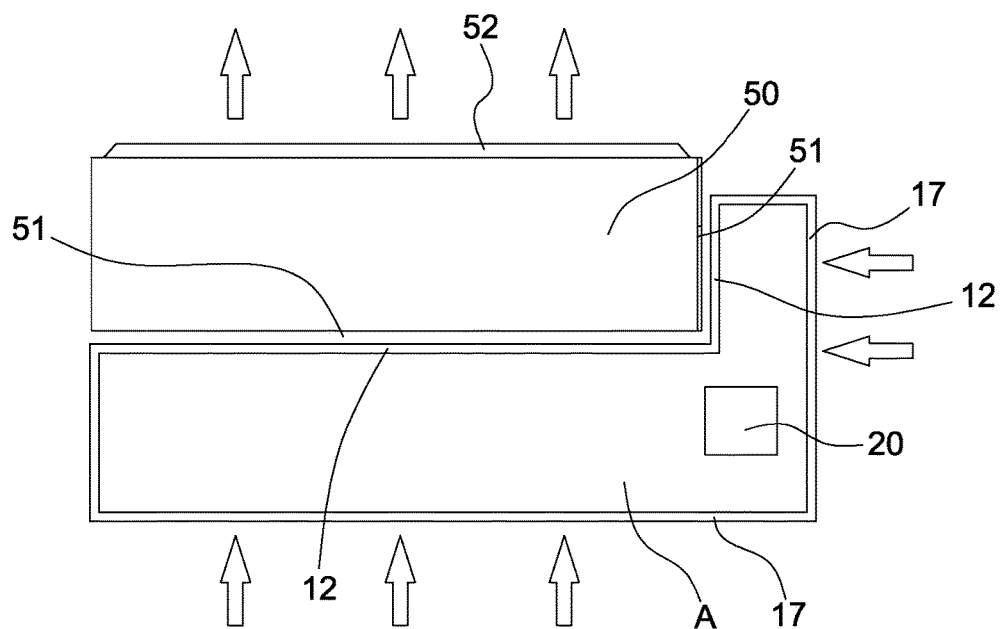
FIG. 5 is a side plan view showing the assembly of a purification structure of a heat dissipator according to a second embodiment of the present invention.

Referring to FIG. 5, in a second embodiment, an inlet segment 51 of a heat dissipator 50 is arranged on a rear end and a side of a heat dissipator 50, and a purification structure A is in an L shape and is arranged beside the rear end and the side (i.e. the inlet segment 51) of the heat dissipator 50.

Figure 6:
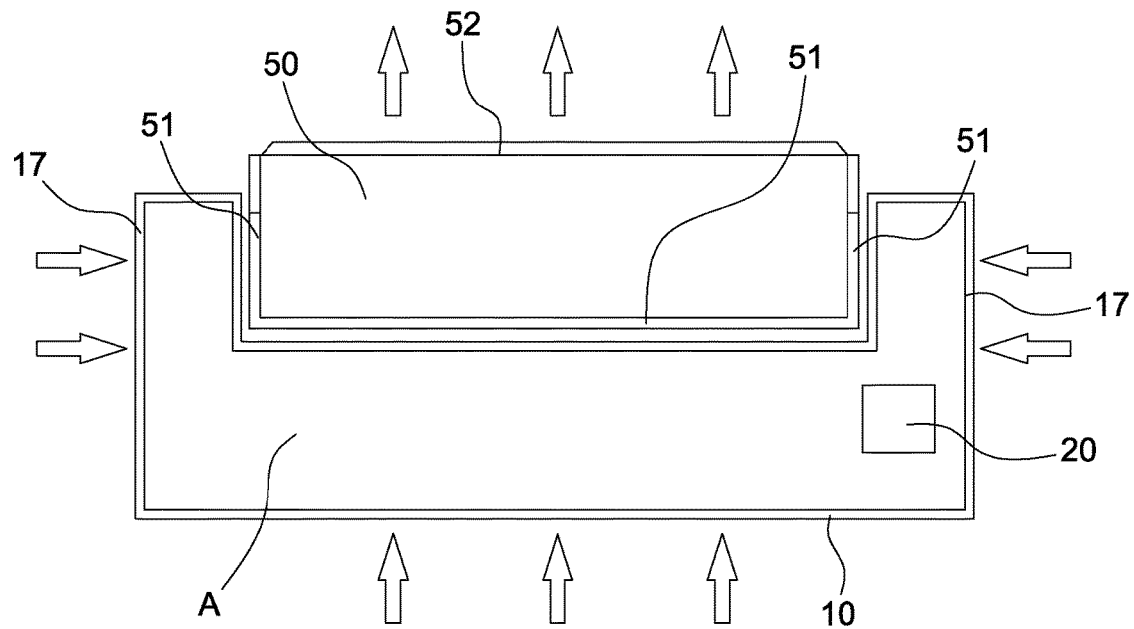
FIG. 6 is a side plan view showing the assembly of a purification structure of a heat dissipator according to a third embodiment of the present invention.

As shown in FIG. 6, in a third embodiment, an inlet segment 51 of a heat dissipator 50 is arranged on a rear end and two sides of a heat dissipator 50, and a purification structure A is in a U shape and is arranged beside the rear end and the two sides (i.e. the inlet segment 51) of the heat dissipator 50.

Figure 7:
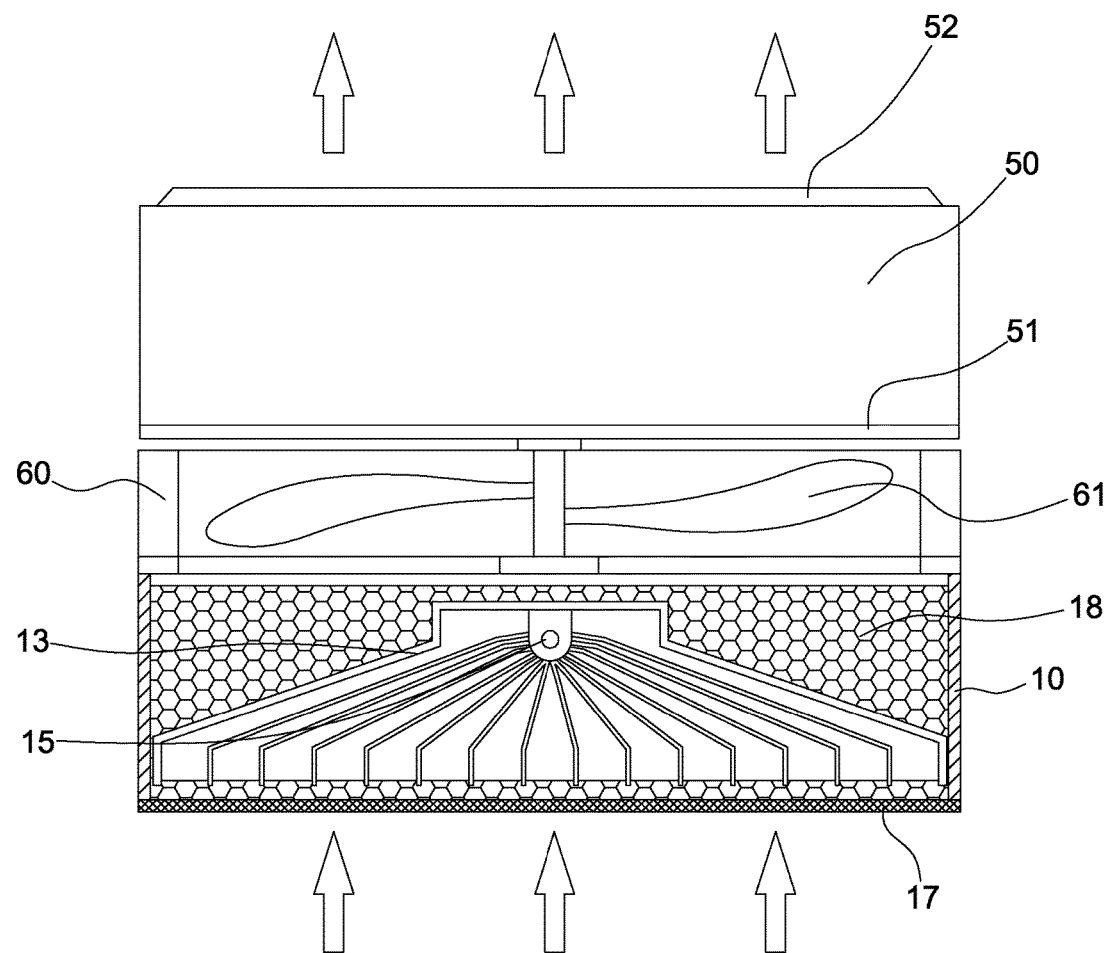
FIG. 7 is a side plan view showing the assembly of a purification structure of a heat dissipator according to a fourth embodiment of the present invention.

With reference to FIG. 7, in a fourth embodiment, the air outlet 12 of the casing 10 is connected with an air venting device 60, and the air venting device 60 includes multiple fan blades 61 arranged therein so as to fan the air, thus dissipating heat effectively.

Accordingly, the purification structure A of the heat dissipator 50 filters and purifies air flowing through the heat dissipator 50, and the purification structure A cools temperature of the heat dissipator 50, thus prolonging a service life of the heat dissipator 50.

Preferably, the heat dissipator 50 recycles the water by using the water collection device 40.

When the air flows through the water mesh 18, its moistures increase so as to dissipate the heat and to lower the electricity consumption of the heat dissipator 50.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A purification structure being located beside an inlet segment of a heat dissipator and comprising:
   a casing including an air inlet and an air outlet which are arranged on two ends of the casing respectively and communicate with each other, and the air outlet corresponding to the inlet segment of the heat dissipator;
   a water mesh including multiple orifices defined on the water mesh, and the water mesh being accommodated between the air inlet and the air outlet of the casing;
   a water distribution seat secured on a top of the water mesh and including an aperture formed on a central position of a top of the water distribution seat, multiple passages communicating with the aperture so that water flows into the water mesh via the multiple passages from the aperture;
   a water collection device communicating with a bottom of the water mesh, and the water collection device including a water accommodation chamber defined therein and configured to store the water flowing from the aperture, a pump housed in the water collection device and configured to output the water, wherein the pump has a water output segment connecting with a guide tube which communicates with the aperture of the water distribution seat, such that the water is outputted by the pump to flow toward the aperture via the guide tube,
   wherein the pump is electrically coupled with an automatic on/off device, and the automatic on/off device includes a temperature sensor and a control switch, wherein when the water collection device is frozen or lacks of the water, the pump is powered off automatically.

2. The purification structure as claimed in claim 1, wherein the water mesh is made of flexible material so as to be bent flexibly at any desired angles, and a size of the water mesh matches with that of the heat dissipator.

3. The purification structure as claimed in claim 1, wherein the automatic on/off device further includes an overload protection circuit.

4. The purification structure as claimed in claim 1, wherein the air outlet of the casing is connected with an air venting device, and the air venting device includes multiple fan blades arranged therein.

5. The purification structure as claimed in claim 1, wherein the water collection device further includes a water outlet defined therein and includes a discharge valve fixed outside the water collection device and corresponding to the water outlet.

6. The purification structure as claimed in claim 1, wherein the water collection device is made of plastic material or metal material.

* * * * *